US007633038B2

United States Patent
Seol

(10) Patent No.: US 7,633,038 B2
(45) Date of Patent: Dec. 15, 2009

(54) HEATED EXHAUST PIPELINE, HEATING APPARATUS, AND METHOD OF CONTROLLING SAME

(75) Inventor: Hyun-Su Seol, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 691 days.

(21) Appl. No.: 11/191,083

(22) Filed: Jul. 28, 2005

(65) Prior Publication Data

US 2006/0051254 A1   Mar. 9, 2006

(30) Foreign Application Priority Data

Sep. 9, 2004   (KR) .................. 10-2004-0072345

(51) Int. Cl.
*H05B 3/58* (2006.01)
*F01N 3/20* (2006.01)

(52) U.S. Cl. ............... 219/535; 219/536; 219/537; 219/538; 219/539; 219/542; 219/552; 422/107; 422/108; 422/109

(58) Field of Classification Search ........... 219/535–9, 219/542, 552; 422/150, 107–9
See application file for complete search history.

(56) References Cited

U.S. PATENT DOCUMENTS

| | | | | |
|---|---|---|---|---|
| 5,125,644 | A | * | 6/1992 | Masaki et al. ............ 271/308 |
| 6,665,492 | B1 | * | 12/2003 | Garcia et al. ............ 392/383 |
| 6,773,687 | B1 | * | 8/2004 | Hasegawa ................. 423/210 |

FOREIGN PATENT DOCUMENTS

| | | |
|---|---|---|
| JP | 08-124866 | 5/1996 |
| KR | 1998-019799 | 6/1998 |
| KR | 101998074785 | 11/1998 |
| KR | 1020020095843 A | 12/2002 |

* cited by examiner

*Primary Examiner*—Shawntina Fuqua
(74) *Attorney, Agent, or Firm*—Volentine & Whitt, PLLC

(57) ABSTRACT

Provided are a heated exhaust pipeline, a related plurality of heating elements attached to an exhaust pipeline, and a method of controlling the plurality of heating elements. Individual heating elements are characterized by a temperature indicator and/or an alarm.

16 Claims, 5 Drawing Sheets

HEATED EXHAUST PIPELINE, HEATING APPARATUS, AND METHOD OF CONTROLLING SAME

BACKGROUND OF THE INVENTION

1. Field of the Invention

In certain embodiments, the present invention relates to a heat exhaust pipeline and a related heating apparatus adapted for use in semiconductor manufacturing equipment. Embodiments of the invention also relate to a method of controlling the related heating apparatus. More particularly, the invention relates in certain embodiments to a method of controlling a heating apparatus that is capable of heating a residual gas exhausted from a semiconductor manufacturing process to a predetermined temperature.

This application claims the benefit of Korean Patent Application No. 2004-72345, filed Oct. 9, 2004, the contents of which are hereby incorporated by reference in their entirety.

2. Description of Related Art

The complicated sequence of processes used to manufacture semiconductor devices typically includes multiple processes characterized by the use of various gases. During and following the completion of these gas-involved processes, one or more "residual gases" will be generated. In a great majority of cases, these residual gases must be exhausted from the processing environment (e.g., from a process chamber). The process of exhausting residual gases may, however, become greatly complicated by the nature of the residual gases. For example, some residual gases, if allowed to cool below a critical temperature, will solidify into a powder form. This powdered residue can make a genuine mess of the exhaust system.

Consider, for example, the case of ammonia chloride ($NH_4Cl$), which may be generated as a residual gas during commonly used low-pressure chemical vapor deposition (LPCVD) processes. Ammonia chloride begins to convert to a solid crystalline state at temperatures around 80° C., and maintains a gaseous state at temperatures above 150° C.

Aluminum chloride ($AlCl_3$), which may be generated as a residual gas during a plasma etching process, such as those commonly used to etch aluminum, is another ready example of a gas which solidifies at temperatures below a critical temperature, and requires some minimum temperature to maintain itself in a gaseous state.

In order to prevent such residual gases from solidifying and thus accumulating as a contaminate in an exhaust pipeline, a separate heating apparatus is typically installed in the exhaust pipeline. One example of an exhaust pipeline provided with a heating apparatus is disclosed in Japanese Laid-open Publication No. 1996-124866. In this document, a plurality of heating elements are installed in an exhaust pipeline. Each one of the heating elements has a separate sensor, and each of the heating elements and its associated sensor are connected to an automated controller. Through operation of the controller, an integrated control state is displayed on an associated display.

Unfortunately, this approach is not without its flaws. For example, this integrated control approach breaks down if just one of the individual sensors fails. A failed sensor may result in a sectional misdetection of the actual temperature of the heated exhaust pipeline. Such misdetection arises because the single display indicator can not indicate undesired temperature variation in a particular section of the heated exhaust pipeline. In fact, some sections of the heated exhaust pipeline may become greatly overheated—potentially leading to equipment damage.

SUMMARY OF THE INVENTION

Embodiments of the invention provide a heated exhaust pipeline adapted for use with semiconductor manufacturing equipment, and particularly well adapted to appropriately exhaust residual gases subject to solidification below a critical temperature. In at least one of these embodiments, the heated exhaust pipeline comprises a plurality of heating elements, each one having an associated temperature sensor, a temperature indicator and/or an alarm.

Fir example, in one embodiment, the invention provides a heated exhaust pipeline comprising an exhaust pipeline adapted to exhaust residual gases from a process chamber, and a plurality of heating elements attached to the exhaust pipe at intervals and adapted to heat the exhaust pipe. Each heating element in the plurality of heating elements comprises a temperature sensor adapted to detect actual temperature, and a temperature indicator adapted to indicate the detected actual temperature.

The temperature indicator may comprise a numerical indicator adapted to display current instantaneous temperature and/or a waveform indicator adapted to indicate detected actual temperature over a period of time.

Each heating element may further comprise a temperature regulator adapted to set a desired temperature and/or an alarm. The alarm may be visual and/or audible.

In another embodiment, the invention provides a heating element adapted to heat an exhaust pipeline. The heating element comprises a heater block installed on the exhaust pipeline and adapted to provide heat to the exhaust pipe, a temperature sensor installed proximate the heater block and adapted to detect an actual temperature associated with the exhaust pipeline, and a temperature indicator installed adjacent to the heater block to indicate the temperature detected by the temperature sensor.

In yet another embodiment, the invention provides a method of controlling a heating element installed on a exhaust pipeline. The method comprises heating the exhaust pipe using a heater block associated with the heating element to a desired temperature, determining whether an actual temperature associated with the heater block is higher than the desired temperature, turning OFF the heater block upon determining that the actual temperature is higher than the desired temperature, upon determining that the actual temperature is not higher the desired temperature, determining whether the heating element operating normally, and upon determining that the heating element is not operating normally actuating an alarm.

BRIEF DESCRIPTION OF THE DRAWINGS

The benefits of the invention will be apparent upon consideration of several embodiments of the invention described hereafter in relation to the accompanying drawing. The drawing is not necessarily to scale, emphasis instead being placed upon illustrating the principles of the invention.

DETAILED DESCRPTION OF THE INVENTION

The present invention is described below in the context of several exemplary embodiments. These embodiments are presented as teaching examples, and are subject to variations and modifications which will be apparent to those of ordinary skill in the art. The actual scope of the invention is defined by the attached claims.

Figure 1:
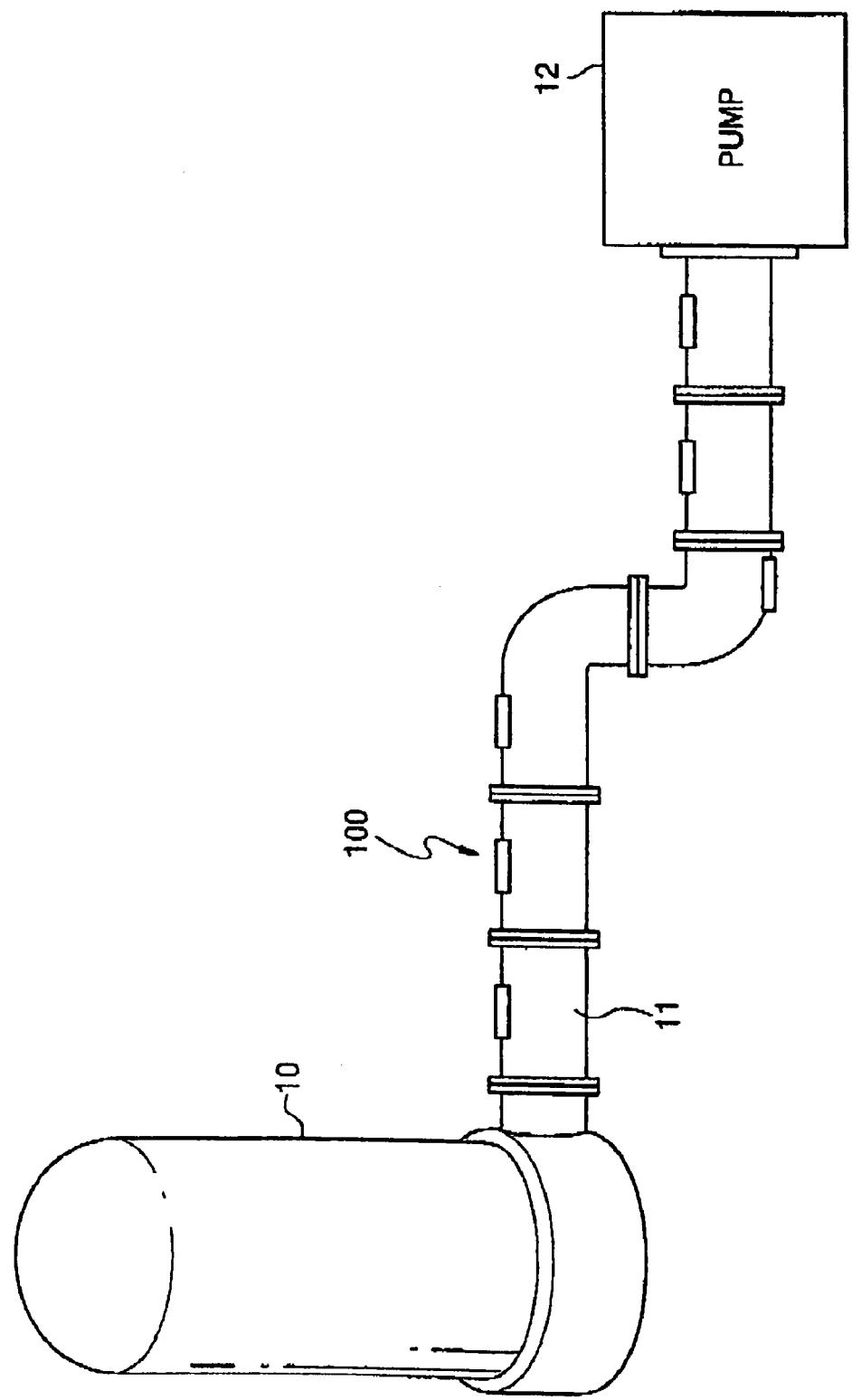
FIG. 1 illustrates a configuration of semiconductor manufacturing equipment including a heated exhaust pipeline according to one embodiment of the invention.

Referring to FIG. 1, a heated exhaust pipeline adapted for use with semiconductor manufacturing equipment and designed in accordance with one embodiment of the invention is connected to a process chamber 10. The exact nature and construction of process chamber 10 is not critical to the invention, but may be, for example, a chamber adapted to perform low-pressure chemical vapor deposition, plasma enhanced chemical vapor deposition, other some other diffusion process. Indeed, the heated exhaust pipeline provided by embodiments of the invention may be adapted for use with any piece of semiconductor manufacturing equipment requiring the exhaust of residual gases.

The heated exhaust pipeline includes an exhaust pipeline 11 connected at one end to process chamber 10 and extending to some distal point at which residual gases may be safely exhausted. In one embodiment, an exhaust pump 12 is installed proximate the distal end of the heated exhaust pipeline. Exhaust pump 12 is conventional in its construction and is typically required to efficiently extract residual gases from the length of the heated exhaust pipeline. In another related aspect (not shown), a conventional trap for solidified residual gases may be provided at some point (typically the distal end) along the heated exhaust pipeline.

In yet another aspect of illustrated embodiment, a plurality of heating elements 100 is installed at spaced intervals along exhaust pipeline 11. The plurality of heating elements 100 is installed in such a manner as to prevent the solidification and/or precipitation of residual gases in the heated length of exhaust pipeline 11. In other words, the heated exhaust pipeline according to this particular embodiment of the invention precludes the undesired gas-to-solid conversion of residual gases, such as, for example, $NH_4Cl$, $AlCl_3$, $SiO_2$, $Cl_3$, and/or $BCl_3$.

Figure 2:
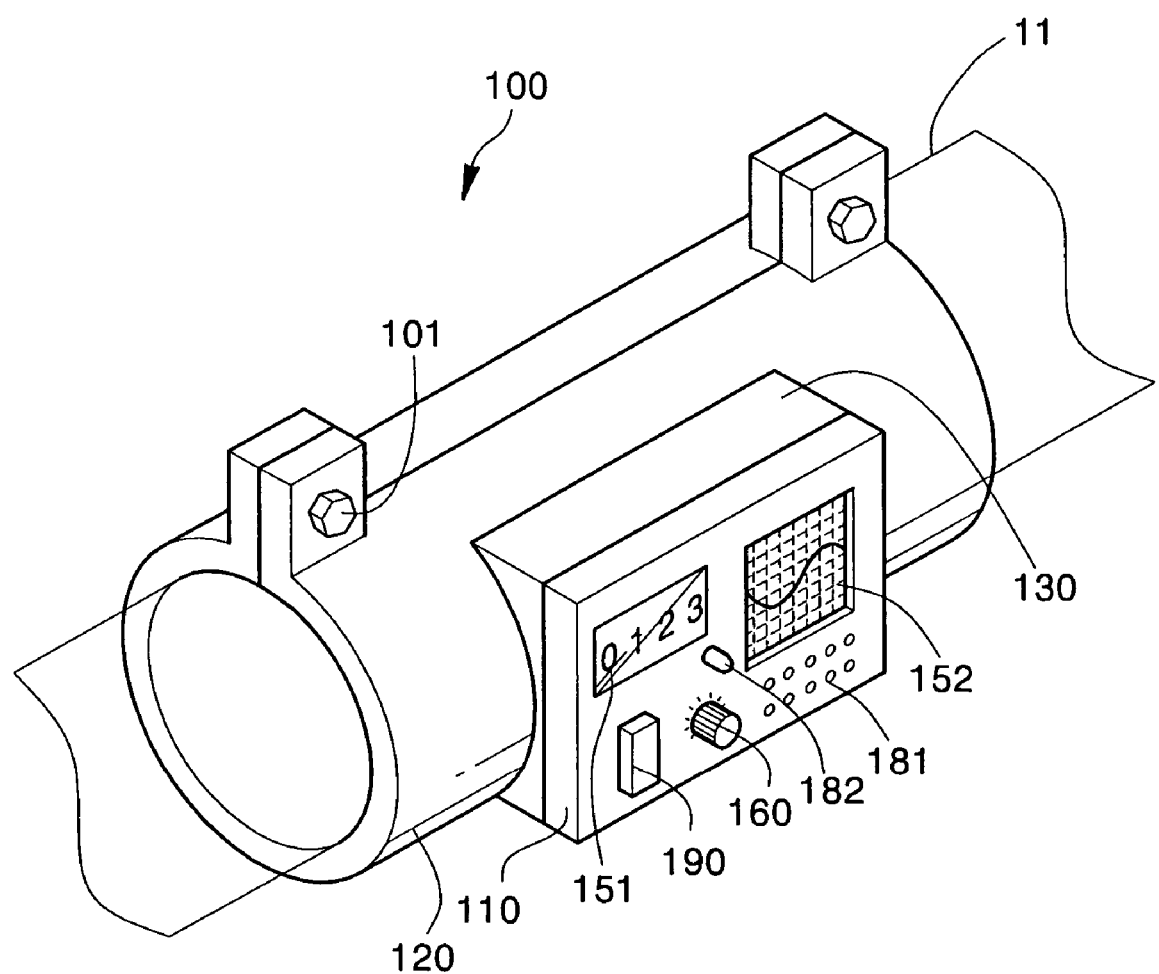
FIG. 2 is a perspective view of a heating apparatus installed on a heated exhaust pipeline according to another embodiment of the invention.
Figure 3:
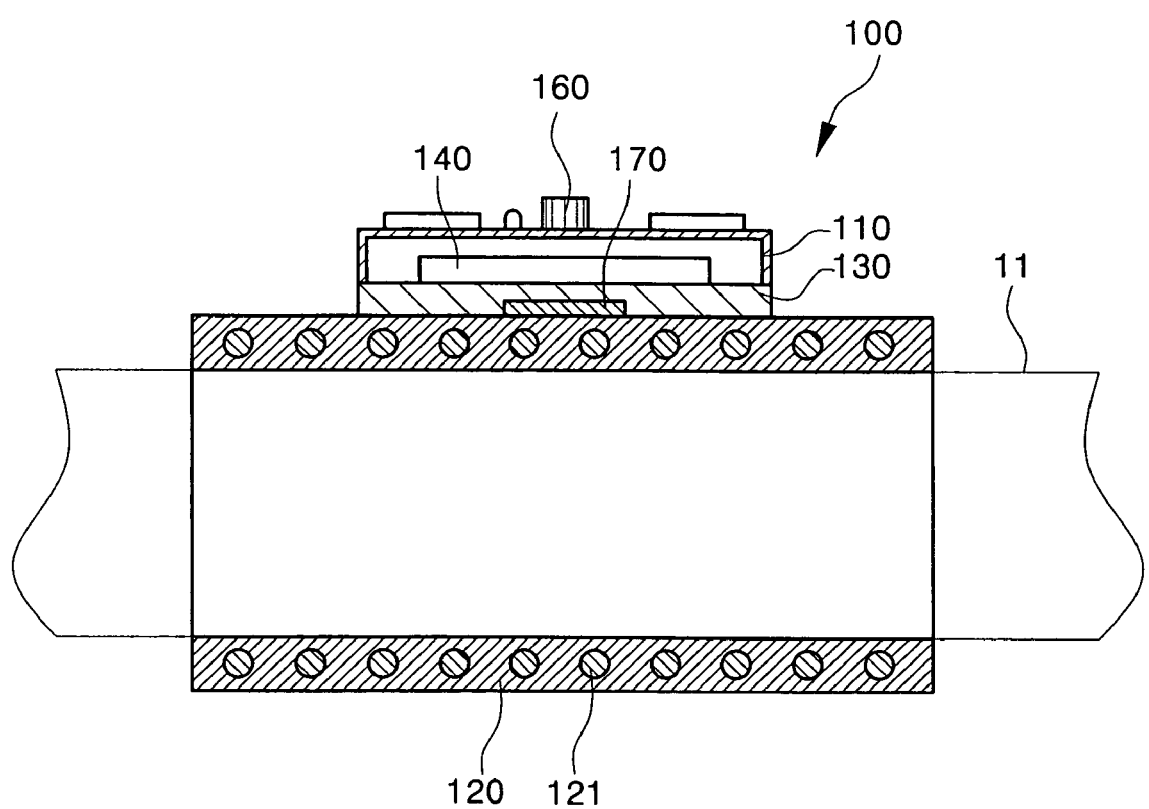
FIG. 3 is a cross-sectional view of the heating apparatus shown in FIG. 2.
Figure 4:
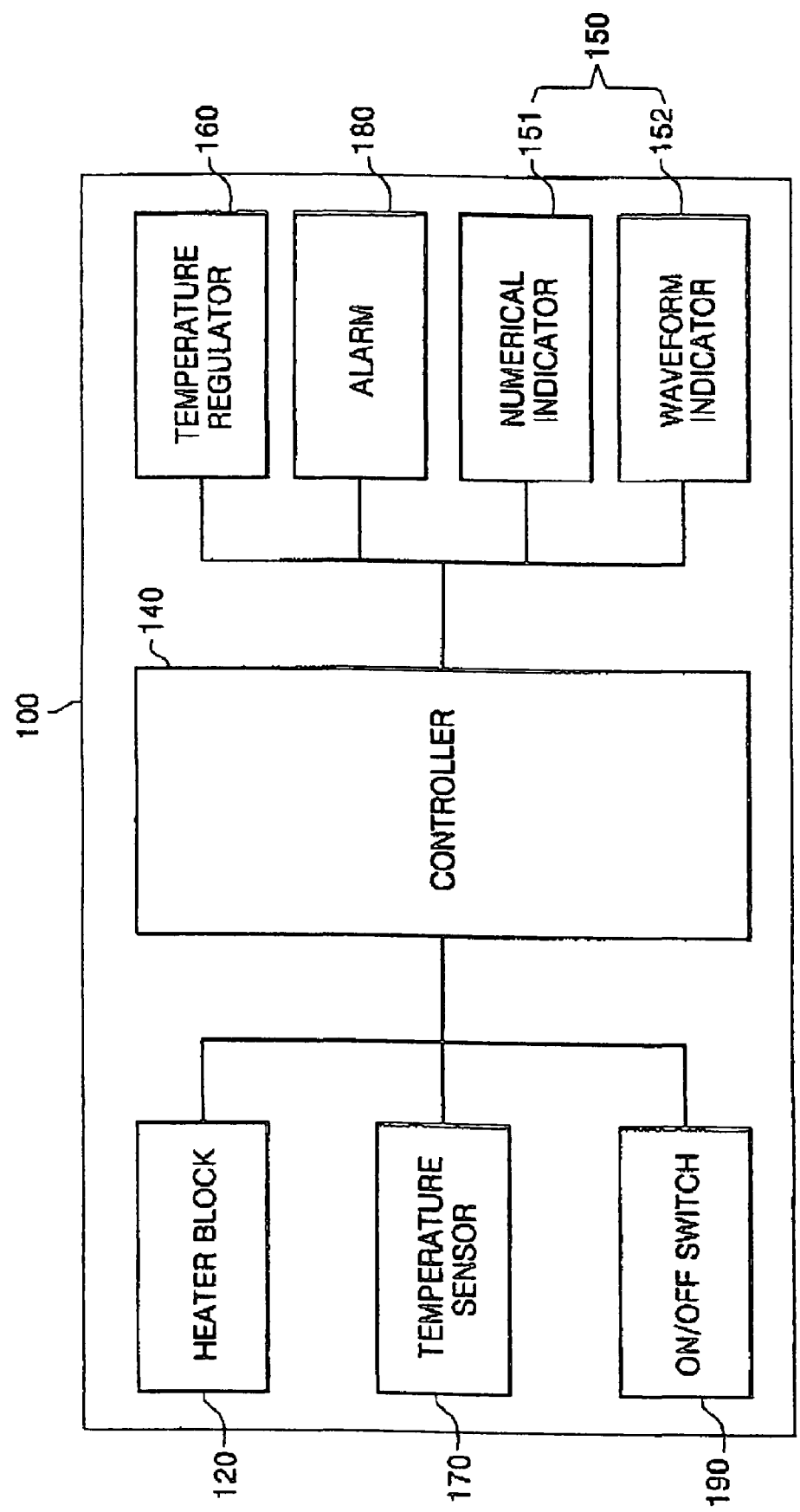
FIG. 4 is a block diagram of the heating apparatus shown in FIGS. 2 and 3.

FIGS. 2, 3, and 4 further illustrate a single heating element 100 installed on the outer surface of exhaust pipeline 11. The illustrated heating element 100 should be considered as merely one example of a competent design for many possible heating element designs.

Specifically, heating element 100 includes a clamped shaped heater block 120 encasing the outer surface of exhaust pipeline 11. A resistive heating wire 121 is wound through heater block 120. When electrical current provided by an external power source (not shown) is passed through heating wire 121 heat is generated within heater block 120. Heating element 100 is designed to provide efficient thermal coupling between heater block 120 and exhaust pipeline 11.

In another aspect of the illustrated example, a case 110 is installed on heater block 120. In order to protect casing 110 from undue thermal stress, a thermal insulating plate 130 may be installed between heater block 120 and case 110. In one embodiment, thermal insulting plate 130 and case 110 are formed from the same material. This configuration allows thermal insulating plate 130 to be formed as an integrated portion of case 110. In a related aspect, thermal insulating plate 130 may have one curved surface adapted to snuggly fit over the outer surface of heater block 130 and one flat surface adapted to attach case 110.

A controller 140 including a plurality of electronic components is installed in case 110. Controller 140 controls the operation of heating element 100. In the illustrated example, one or more temperature indicators (e.g., 151 and 152) are used to monitor the temperature of the heated exhaust pipeline. Further, an adjustable temperature regulator 160 is installed in case 110. The temperature regulator 160 controls the heat generated by heating wire 121 within heater block 120. In this manner, the temperature provided within exhaust pipeline 11 by heating element 100 may be accurately regulated. In one embodiment, temperature regulator 160 controls the heat generated by heating wire 121 by regulating the voltage/current applied to heating wire 121. An ON/OFF switch 190 is also provided within case 110 to enable/disable heating apparatus 100.

In the illustrated embodiment, a numerical temperature indicator 151 displays the current temperature of the heated exhaust pipeline. Numerical temperature indicator 151 may be formed from a digital liquid crystal display or a similar conventional device. Additionally, a waveform indicator 152 may be provided to indicate in graphical form the time-wise state of temperature within exhaust pipeline 11 over a defined period of time. Waveform indicator 152 may be formed from a conventional analog or digital type device. The foregoing are just presently preferred example, and generally speaking, one or more temperature indicators 150 of any competent design may be used in relation to heating element 100.

A temperature sensor 170, such as a thermocouple, may be installed between thermal insulating plate 130 and heater block 120. Temperature sensor 170 accurately detects heat generated by heater block 120 and communicates the detected temperature value to controller 140.

An alarm mechanism 180 may also be installed in case 110. The alarm, which may be conventionally provided, may be acoustic and/or visual in nature. Certain operating states (e.g., temperature limits, sensor failure, etc.) may be established and monitored within controller 140, and associated with actuation of the alarm. When such operating states are violated, the alarm may actuate to notify an equipment operator or a supervisory control mechanism. In the illustrated example, a speaker 181 and an LED lamp 182 are provided in case 110 and function as multiple alarms. Naturally, many different types of alarm mechanism might additionally or alternately be used.

The operation of the exemplary heated exhaust pipeline, like the one illustrated in FIGS. 2 and 3, will now be described.

It is first assumed that a heating element 100 is securely attached around exhaust pipeline 11. Bolted mechanical fasteners 101 may be used for this purpose. With heating element 10 in place, ON/OFF switch 190 may be actuated to power up heating element 100 and begin heating exhaust pipeline 11.

When the heating operation starts, an operator may set temperature regulator 160 to a desired temperature level. If we assume for the moment that the exhaust of ammonia chloride as a residual gas by the heated exhaust pipeline is in issue, the temperature set by temperature regulator 160 should be at least 150° C. since the ammonia chloride will maintain a gaseous state at such temperatures. Obviously, different residual gases may require that different temperatures be established by temperature regulator 160.

Temperature sensor 170 detects the actual temperature of heater block 120. As detected by temperature sensor 170 and controlled by controller 140, the instantaneous temperature is indicated on numerical indicator 151, and recorded graphically by waveform indicator 152. After the actual temperature of heater block 120 as detected by temperature sensor 170 rises to the desired level indicated by operation of temperature regulator 160, controller 140 stops the heating operation. Similarly, as the actual temperature falls below the desired temperature, controller 140 reinitiates the heating operation so as to properly maintain the associated portion of exhaust pipeline 11 at the desired temperature.

By viewing or otherwise monitoring (such as with alarms) the provided temperature indicators, an equipment operator may determine current temperature data, historical temperature data, and also determine whether heating element 100, or any component part of element 100 is operating properly. However, proper operation of the heating element designed in accordance with the invention need not rely on an accurate assessment of the situation by an equipment operator. Rather, the various alarms may be adapted to automatically indicate departures from established operating conditions (i.e., abnormal states of operation). For example, controller 140 may cause alarm 180, such as LED lamp 182 and/or speaker 181, to actuate.

Numerous abnormal states of operation are certainly possible within the context of heating element 100. For example, temperature sensor 170 and/or heater block 120 may malfunction, potentially causing damage to the heated exhaust pipeline or other components associated with heating element 100. However, the use of multiple temperature indicators 150, such as an instantaneous numerical indicator 151 and a timewise waveform indicator 152, may alleviate much of the danger associated with such malfunctions. That is, the likelihood of simultaneous failure for multiple temperature indicators is exceptionally low. Further, the provision of multiple alarm features, such as LED lamp 182 and speaker 181, creates additional redundancy in the heating element's ability avoid prolonged malfunction.

It is necessary to provide some mechanism for the prompt detection of a malfunction in some critical component of heating element 100, such as temperature sensor 170 or heater block 120. If prompt remedial action is not taken in such cases, serious problems may arise. For example, since heater block 120 will continuously operate to raise the temperature of the exhaust pipeline 11 to a desired level, non-indication of temperature by a broken temperature sensor 170 may result in exhaust pipe 11 being quickly overheated, thereby damaging the equipment.

Figure 5:
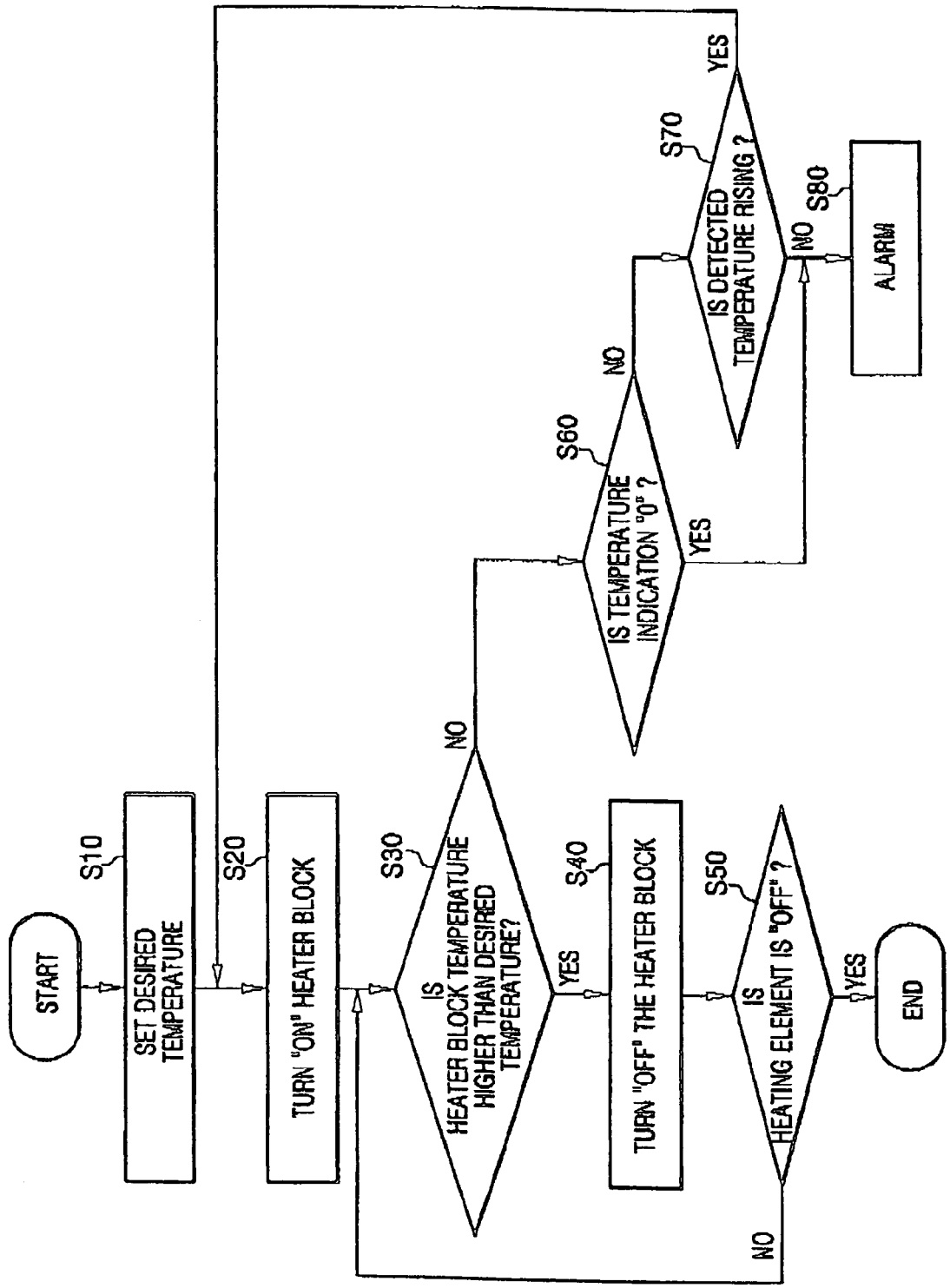
FIG. 5 is a flow chart illustrating a control operation for a heated exhaust pipeline designed in accordance with one embodiment of the invention.

Hereinafter, a method of controlling the exemplary heating element will be described with reference to FIG. 5. Exemplary method steps are indicated in parentheses (SXX).

After turning "ON" heating element 100 using ON/OFF switch 190, a predetermined temperature is set using temperature regulator 160 (S10). Then, heater block 120 is turned "ON" to perform a heating operation (S20), and temperature sensor 170 begins detecting actual temperature.

After the heating and temperature detection operations are begun, controller 140 compares the detected temperature provided by temperature sensor 170 with the desired temperature level in order to determine whether the temperature of heater block 120 is higher than the desired temperature level (S30).

If yes, then controller 140 turns heater block 120 "OFF" (S40). If no, then controller 140 determines whether heating element 100 is operating normally or out of order when the temperature of heater block 120 is lower than the desired level (S60 and S70).

Where the temperature of heater block 120 is not higher than the desired level (S30=no), a determination is constantly made as to whether heating element 100 is operating normally or is out of order. This determination is made by first determining whether temperature sensor 170 is detecting a heater block temperature of zero or some other minimum value (S60). It yes, then alarm 180 is actuated (S80).

If no, then a further determination is made as to whether the heater block temperature is rising (S70). If yes, then the control routine loops back to step (S20) and turns "ON" heater block 120. However, if the detected heater block temperature is not rising, alarm 180 is actuated (S80).

In the foregoing control routine, so long as the detected actual temperature provided by temperature sensor 170 is non-zero or some other pre-set value, temperature sensor 170 is assumed to be operating properly, but when a zero value is received from temperature sensor 170 it is assumed to be out of order and controller 140 actuates alarm 180.

So long as temperature sensor 170 outputs a non-zero value and is therefore assumed to be operating normally, heater block 120 should cause the detected temperature to rise, otherwise heater block 120 is assumed to have malfunctioned and controller 140 will actuate alarm 180.

Controller 140 may readily recognize whether the detected temperature is rising over time by comparing a current temperature value displayed on numerical indicator 151, for example, with stored temperature data displayed over time on waveform indicator 152, for example.

Even where alarm 180 is not employed, abnormal temperature states may be indicated on numerical indicator 151 and/or waveform indicator 152. Thus, an equipment operator may determine an abnormal temperature state by viewing indicators 151 and 152, and then take proper remedial action.

In the foregoing exemplary control routine, so long as the detected temperature remains above the desired level (S30=yes), heater block 120 is turned "OFF" (S40). Only when the detected temperature falls below the desired value will the control routine loop back to turn heater block 120 "ON," provided critical components of heating element 100 are operating properly (S60 and S70).

As can be seen from the foregoing, the heated exhaust pipeline and heating element described in the invention are well adapted for use with semiconductor manufacturing equipment. The proposed exemplary method of controlling the heating element is capable of effectively and accurately heating the associated exhaust pipeline, while ensuring that the heating element is, in fact, operating properly.

Preferred embodiments of the invention have been described above, and although specific terms and descriptive contexts have been employed, they should be viewed and interpreted in a broad general sense as they are intended to communicate in specific example more generic inventive teachings. Accordingly, it will be understood by those of ordinary skill in the art that various changes in form and details may be made without departing from the scope of the invention as set forth in the following claims.

What is claimed is:

1. A heated exhaust pipeline, comprising:
   an exhaust pipeline adapted to exhaust residual gases from a process chamber;
   a plurality of heating elements attached to the exhaust pipe at intervals and adapted to heat the exhaust pipe, wherein each heating element in the plurality of heating elements comprises:
   a temperature sensor adapted to detect an actual temperature of the heating element; and
   a temperature indicator adapted to indicate the detected actual temperature, wherein the temperature indicator comprises at least one of a numerical indicator adapted to display current instantaneous temperature and a waveform indicator adapted to indicate detected actual temperature over a period of time.

2. A heating element adapted to heat an exhaust pipeline, comprising:
a heater block installed on the exhaust pipeline and adapted to provide heat to the exhaust pipe;
a temperature sensor installed proximate the heater block and adpated to detect an actual temperature of the exhaust pipeline immediately proximate the heater block; and
a temperature indicator installed adjacent to the heater block to indicate the actual temperature detected by the temperature sensor, wherein the temperature indicator comprises at least one of a numerical indicator adapted to display current instantaneous temperature and a waveform indicator adapted to indicate detected actual temperature over a period of time.

3. A heating element adapted to heat an exhaust pipeline, comprising:
a heater block installed on the exhaust pipeline and adapted to provide heat to the exhaust pipe;
a temperature sensor installed proximate the heater block and adapted to detect an actual temperature associated with the exhaust pipeline; and
a temperature indicator installed adjacent to the heater block to indicate the acutal temperature detected by the temperature sensor, wherein the heater block comprises a case housing the temperature indicator.

4. The heating element of claim 3, further comprising a thermal insulating plate installed between the heater block and the case.

5. The heating element of claim 4, wherein the temperature sensor is installed between the thermal insulating plate and the heater block.

6. The heating element of claim 3, wherein the case further houses a temperature regulator adapted to regulate heater block temperature.

7. The heating element of claim 3, wherein the case further houses an ON/OFF switch.

8. A heating element adapted to heat an exhaust pipeline, comprising:
a heater block installed directly on the exhaust pipeline and adapted to provide heat to the exhaust pipe;
a temperature sensor installed proximate the heater block and adpated to detect an actual temperature of the exhaust pipeline immediately proximate the heater block; and
a temperature indicator installed adjacent to the heater block to indicate the actual temperature detected by the temperature sensor, wherein the heater block is adpated to be clamped around the exhaust pipeline using a mechanical fastener.

9. A method of controlling a heating element installed on an exhaust pipeline, comprising:
heating the exhaust pipeline using a heater block associated with the heating element to a desired temperature;
determining whether an actual temperature of the exhaust pipeline immediately proximate the heater block is higher than the desired temperature;
turning OFF the heater block upon determining that the actual temperature is higher than the desired temperature;
upon determining that the actual temperature is not higher the desired temperature, determining whether the heating element is operating normally; and,
upon determining that the heating element is not operating normally, actuating an alarm,
wherein determining whether the heating element is operating normally comprises:
determining whether a temperature sensor outputs a zero value or not.

10. A method of controlling a heating element installed on an exhaust pipeline, comprising:
heating the exhaust pipeline using a heater block associated with the heating element to a desired temperature;
determining whether an actual temperature of the heater block is higher than the desired temperature;
turning OFF the heater block upon determining that the actual temperature is higher than the desired temperature;
upon determining that the actual temperature is not higher the desired temperature, determining whether the heating element is operating normally; and,
upon determining that the heating element is not operating normally, actuating an alarm,
wherein determining whether the heating element is operating normally comprises:
determining whether the actual temperature is rising over an established time period.

11. A method of controlling a heating element installed on an exhaust pipeline, comprising:
heating the exhaust pipeline using a heater block associated with the heating element to a desired temperature;
determining whether an actual temperature of the heater block is higher than the desired temperature;
turning OFF the heater block upon determining that the actual temperature is higher than the desired temperature;
upon determining that the actual temperature is not higher the desired temperature, determining whether the heating element is operating normally; and,
upon determining that the heating element is not operating normally, actuating an alarm, wherein the heating element comprises a temperature indicator.

12. The method of claim 11, wherein the temperature indicator comprises at least one of a numerical indicator adapted to display current instantaneous temperature and a waveform indicator adapted to indicate detected actual temperature over a period of time.

13. The method of claim 11, wherein the heater block comprises a case visably housing the temperature indicator.

14. The method of claim 13, wherein the heating element further comprises a thermal insulating plate installed between the heater block and the case.

15. The method of claim 14, wherein a temperature sensor is installed between the thermal insulating plate and the heater block.

16. The method of claim 13, wherein the case further comprises a temperature regulator adapted set the desired temperature.

* * * * *